(12) United States Patent
Etoh et al.

(10) Patent No.: US 8,203,803 B2
(45) Date of Patent: Jun. 19, 2012

(54) MAGNETIC RECORDING HEAD FOR PERPENDICULAR RECORDING WITH WRAP AROUND SHIELD, THE FABRICATION PROCESS AND MAGNETIC DISK STORAGE APPARATUS MOUNTING THE MAGNETIC HEAD

(75) Inventors: Kimitoshi Etoh, Kanagawa (JP); Masafumi Mochizuki, Tokyo (JP); Isao Nunokawa, Kanagawa (JP); Tomohiro Okada, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 346 days.

(21) Appl. No.: 11/254,138

(22) Filed: Oct. 18, 2005

(65) Prior Publication Data
US 2006/0082924 A1 Apr. 20, 2006

(30) Foreign Application Priority Data
Oct. 20, 2004 (JP) .................................. 2004-305843

(51) Int. Cl.
*G11B 5/31* (2006.01)
*G11B 5/127* (2006.01)

(52) U.S. Cl. ..................................... 360/125.3; 360/122

(58) Field of Classification Search .................. 360/122, 360/125.03–125.32
See application file for complete search history.

(56) References Cited

U.S. PATENT DOCUMENTS

| 4,885,649 | A  | * | 12/1989 | Das ................................ 360/321 |
| 4,935,832 | A  | * | 6/1990 | Das et al. ....................... 360/112 |
| 5,075,956 | A  | * | 12/1991 | Das .............................. 29/603.14 |
| 6,954,340 | B2 | * | 10/2005 | Shukh et al. ................... 360/317 |
| 7,009,812 | B2 | * | 3/2006 | Hsu et al. .................. 360/125.12 |
| 7,227,720 | B2 | * | 6/2007 | Sasaki et al. .............. 360/125.12 |
| 2002/0176214 | A1 |  | 11/2002 | Shukh et al. |
| 2005/0057852 | A1 | * | 3/2005 | Yazawa et al. ................ 360/125 |
| 2005/0280936 | A1 | * | 12/2005 | Sasaki et al. .................. 360/126 |

FOREIGN PATENT DOCUMENTS

| JP | 02-201710 | 8/1990 |
| JP | 2004-281017 | 10/2004 |
| JP | 2005-092929 | 4/2005 |

OTHER PUBLICATIONS

Liu, Francis et al., "*Design and Characterization of Advanced Perpendicular Magnetic Recording Head*", The Magnetic Recording Conference (TMRC), 2003, Abstract No. E6.

* cited by examiner

*Primary Examiner* — Will J Klimowicz
(74) *Attorney, Agent, or Firm* — Daphne L. Burton; Burton IP Law Group (57) ABSTRACT

Embodiments of the invention are directed to narrowing a read/write gap of a perpendicular magnetic head by applying a wrap around shield, data erasing from return pole edges by returning recording field, and reducing TPR of a magnetic material. In one embodiment, the wrap around shields are formed by partitioning and making Gd, which is the height of the shield at the main pole side in the sensor height direction, smaller than the height of the shield connected to the return pole in the sensor height direction.

18 Claims, 9 Drawing Sheets

MAGNETIC RECORDING HEAD FOR PERPENDICULAR RECORDING WITH WRAP AROUND SHIELD, THE FABRICATION PROCESS AND MAGNETIC DISK STORAGE APPARATUS MOUNTING THE MAGNETIC HEAD

CROSS-REFERENCES TO RELATED APPLICATIONS

This application claims priority from Japanese Patent Application No. JP2004-305843, filed Oct. 20, 2004, the entire disclosure of which is incorporated herein by reference.

BACKGROUND OF THE INVENTION

The present invention relates to a thin film magnetic head used for reading/reproducing in a magnetic disk apparatus, etc. and to a fabrication process thereof. More particularly, it relates to a method for fabricating a write head.

The need for saving images and music to a hard disk drive has quickly received widespread attention as seen in such products as video recorders with add-on hard disk drives and televisions with built-in hard disk drives. As a consequence of the increase in image data, achieving higher density has been required of the areal recording density of a magnetic disk drive. Recently, in magnetic heads, in order to achieve a high areal density exceeding 100 Gbit/inch$^2$ there has been rapid progress in a technology shift from a longitudinal recording to a perpendicular recording. This is because thermal fluctuation of the magnetization of the medium appears when the current longitudinal recording method is used and the bit length is made smaller, resulting in it being impossible to increase the areal recording density. On the other hand, the problem of thermal fluctuation can be avoided in a perpendicular magnetic recording method because it is magnetized in the perpendicular direction. Moreover, the recording ability is improved by using a single pole head for recording because the magnetic loss is small and it has a soft underlayer on the medium side. This also becomes a motivation to shift to the above-mentioned perpendicular magnetic recording.

Figure 1:
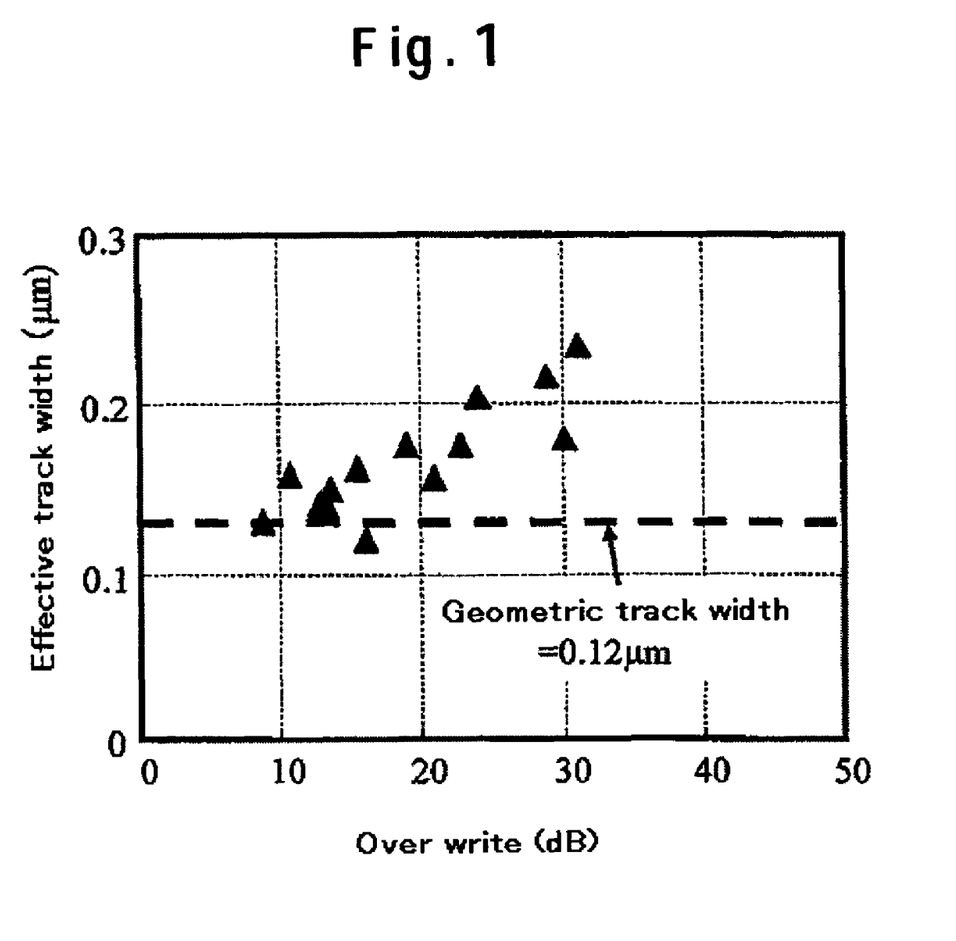
FIG. 1 is a graph illustrating a relationship between overwrite and the effective cross-track on the medium.

In order to increase the areal recording density, it is necessary to improve the track density and the linear recording density in a perpendicular magnetic head. In order to improve the track density, narrowing the track width for writing on a medium is required, concretely; there are methods such as (1) narrowing the track width of the main pole and (2) preventing side writing, etc. The following are additional descriptions of (2). FIG. 1 shows the relationship between overwrite and the effective track widths on the medium. Since at least 30 dB is required for overwrite, it is understood that the effective track width is greater than the geometric track width as shown in the figure. The reason is thought to be the side writing from the main pole, although it also depends on the medium and the flying distance between the medium and the head.

Moreover, in order to improve the linear recording density it is necessary to improve the recording gradient of the recording head. A trailing shield is proposed, in which the shield is placed on the main pole through a magnetic gap, as a method to improve the recording gradient. Using this method, the recording gradient is improved, but it is impossible to prevent side writing in the cross-track direction. Therefore, a structure was proposed in which a shield is placed surrounding the main pole with a magnetic gap. Placing this shield is expected to be effective for side writing and improvement of the recording gradient, although there is concern about the magnetic field strength, because it simultaneously shields both the track width direction and the trailing direction.

A perpendicular magnetic head is proposed in US2002/0176214A1, in which a read head is placed at the trailing side and a wrap around shield at the leading side. Abstract No. 56 of The Magnetic Recording Conference (TMRC) 2003 discloses a perpendicular magnetic head in which a wrap around shield is provided and the return poles are placed at the trailing side and the leading side of the main pole.

BRIEF SUMMARY OF THE INVENTION

The structure disclosed in US 2002/0176214 A1 is one in which the side shield is directly connected to the return pole. The typical value of the shield thickness in the sensor height direction is as thin as 100 nm to 200 nm, therefore, there is concern about the small margin while polishing during the fabrication process for the slider and about the small margin against shock inside the drive.

Moreover, in the structure disclosed in Abstract No. 56E6 of TMRC2003, a return pole is placed on top of and below the main pole to which a wrap around shield is applied and the read/write distance becomes large, resulting in a decrease in the format efficiency.

On the other hand, it is known as a peculiar problem of a perpendicular magnetic head that recording flux concentrates in the return pole edges, and data are erased when the recording field returns to the return pole through the soft underlayer of the medium. Moreover, there is a problem of TPR (Thermal Protrusion). TPR is a phenomenon in which magnetic materials such as NiFe composing a magnetic head expand thermally and push out to the medium side because of generated heat from a coil and the temperature increase of the operation environment. The problem of TPR also exists in a longitudinal recording magnetic head.

A feature of the present invention is to provide a structure of a magnetic head for perpendicular recording suitable for a wrap around shield and a fabrication process thereof, and to enlarge the margin in a wrapping process of a thin film wrap around shield and against shock in the drive. Furthermore, it is a feature of the present invention to provide a magnetic head for perpendicular recording in which flux concentration toward the edges of a return pole caused by return recording flux from a main pole via a medium can be distributed, which is a peculiar problem of a perpendicular magnetic head, and the TPR can be decreased at the same time.

In accordance with an aspect of the present invention, the shield around the main pole is formed by being partitioned while fabricating a perpendicular magnetic head comprising a lower shield, an upper shield, a read head which has a magneto-resistive element formed between the lower shield and upper shield, a main pole and a return pole and a coil, and a shield formed around the main pole through a magnetic gap. This shield is called a wrap around shield because it shields both sides in the cross-track direction and the trailing direction. When a shield on the main pole side is defined to be the wrap around shield I and a shield connected to the return pole is defined to be the wrap around shield II, in a perpendicular magnetic head having a wrap around shield formed by partitioning, the shield height of the wrap around shield II is larger than the wrap around shield I in the sensor height direction.

As a process for fabricating a perpendicular magnetic head forming a wrap around shield by partitioning, a main pole is formed after first forming an upper magnetic shield of the read head and fabricating an insulating layer separating the read head from the write head. Next, a magnetic gap is formed around the main pole and the wrap around shield I is manufactured by using a frame plating technique. The position against the read head must be accurately controlled because the wrap around shield I has a film thickness of Gd, as thin as 100-200 nm in the sensor height direction. Moreover, a soft magnetic material such as Permalloy (NiFe) etc. is used for the shield. Then alumina is formed, and planarized once by CMP (Chemical Mechanical Polish). A frame is shifted in the sensor height direction on the planarized wrap around shield I, then the wrap around shield II is formed to be larger in the sensor height direction by using a frame plating technique. A soft magnetic material is used for the shield, the same as the wrap around shield I. The cross-sectional shape in the sensor height direction becomes a step structure because the wrap around shield is formed by partitioning it into two as mentioned above. After formation of the wrap around shield II, the coil and the coil insulating layer are formed and planarized by CMP. A return pole is connected to the planarized wrap around shield II.

According to the present invention, the area of the very thin wrap around shield I can be decreased by forming the wrap around shield II thicker in the sensor height direction. As a result, the impact strength is increased and the margin is enlarged against impact due to fabrication processes such as polishing.

Moreover, the film thickness in the sensor height direction of the wrap around shield II connected to the return pole is as thick as about 300 nm or more, so that the area of the return pole as seen from the air bearing surface becomes as large as the area of the wrap around shield II. Therefore, it is possible to make the return pole itself thinner. As a result, the TPR of the return pole can be reduced. Moreover, enlarging the area of the return pole makes it possible to disperse the flux by which the recording field returns to the return pole via the medium, and at the same time brings with it the effects of improving the data erasing at the ends of the return pole.

BRIEF DESCRIPTION OF THE DRAWINGS

FIGS. 8(1) and 8(2) are drawings showing a process flow of the present invention.

DETAILED DESCRIPTION OF THE INVENTION

Specific embodiments of the present invention will be described with the accompanying drawing as follows. In the each of the following figures, parts with the same function will be shown using the same code.

Figure 2:
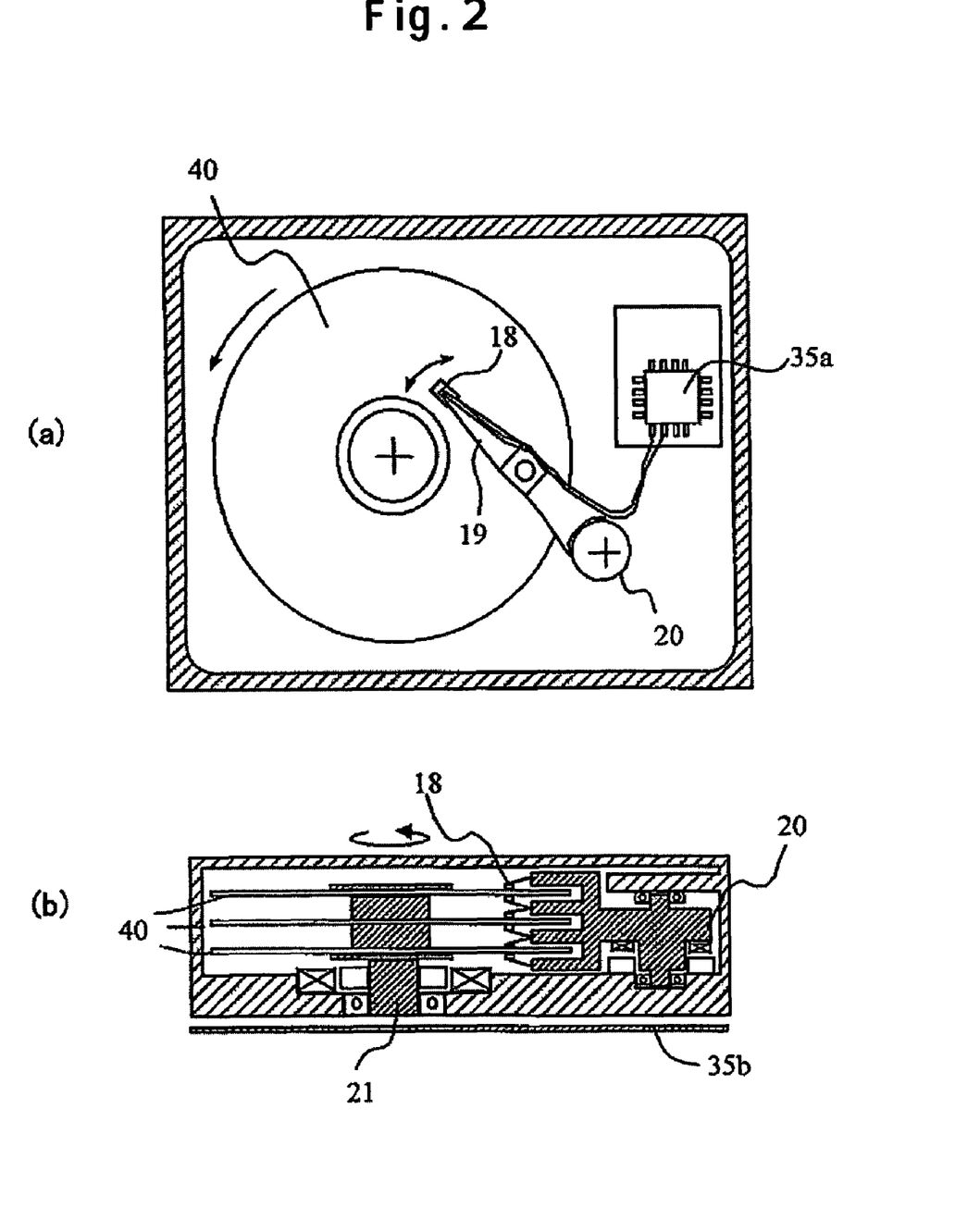
FIG. 2 is a schematic drawing of an example illustrating a magnetic recording apparatus.

FIG. 2 (2a and 2b) is a schematic drawing of an example illustrating a magnetic recording apparatus. The magnetic recording apparatus writes and reads magnetic signals using a magnetic head mounted on a slider 18 fixed at the tip of a suspension arm 19 at a predetermined position on a rotating magnetic disk (magnetic recording medium) driven by a motor 21. A position (track) in the magnetic disk radial direction of the magnetic head can be selected by driving a rotary actuator 20. Writing signals to the magnetic head and reading signals from the magnetic head are processed at signal processing circuits 35a and 35b.

Figure 3:
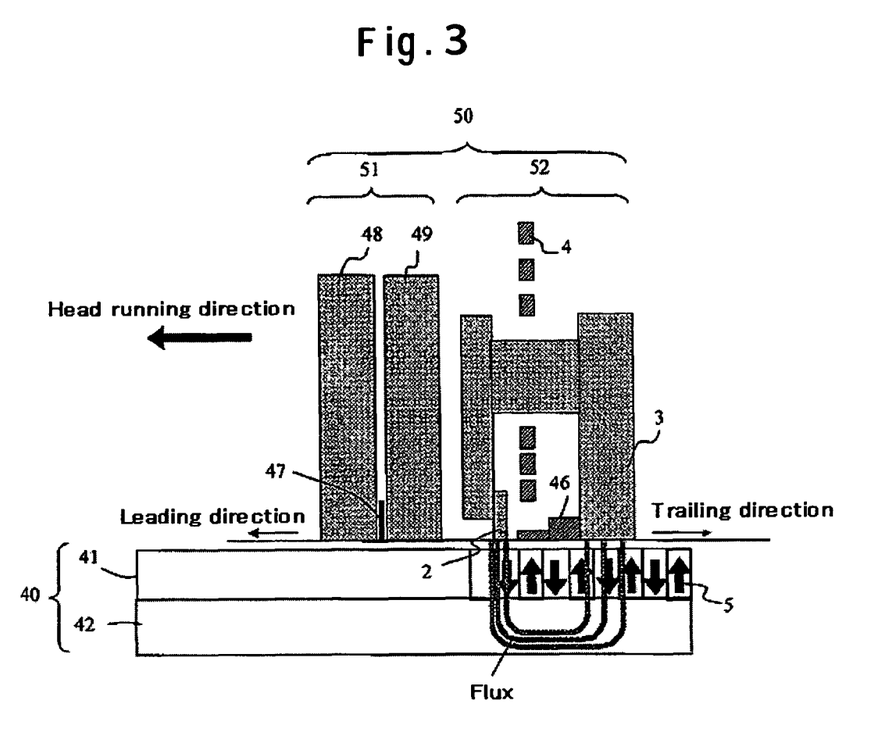
FIG. 3 is a schematic drawing of an example illustrating an overview of perpendicular recording and the relationships between a perpendicular magnetic head and a magnetic disk.

FIG. 3 is a schematic drawing of an example illustrating an overview of perpendicular recording and the relationships between the perpendicular magnetic head 50 and the magnetic disk 40. The perpendicular magnetic head 50 of the present invention is structured by laminating a lower read shield 48, a read element 47, an upper read shield 49, a main pole 2, a thin film coil 4, and a return pole 3, in order, from the head running direction (leading direction). A read head 51 consists of the lower read shield 48, the read element 47, the upper read shield 49, and a write head (single pole head) 52 consists of the main pole 2, the thin film coil 4, and the return pole 3. A wraparound shield 46 is formed around the main pole 2. Concerning the case when the head has a skew angle, the shape of the air bearing surface of the main pole 2 is made to be trapezoidal with the narrower width in the leading direction. The magnetic field coming out from the main pole 2 of the write head 52 passes through a magnetic recording layer 41 and a soft under layer 42 of the magnetic disk 40, creating a magnetic circuit going into the return pole 3, and recording a magnetization pattern on a magnetic recording layer 41. At this time, according to the relationship with the disk rotating direction, the shape of the magnetization pattern is drastically affected by parts where the main pole 2 is separated at the end from points of the magnetic disk, that is, the shapes of the upper surface (trailing direction) and the side of the main pole. There is a case where an intermediate layer is formed between the magnetic recording layer 41 and the soft under layer 42 of the magnetic disk 40. A giant magneto-resistive element (GMR) and a tunneling magnet-resistive element (TMR), etc. are used for the read element 47 of the read head 51.

Figure 4:
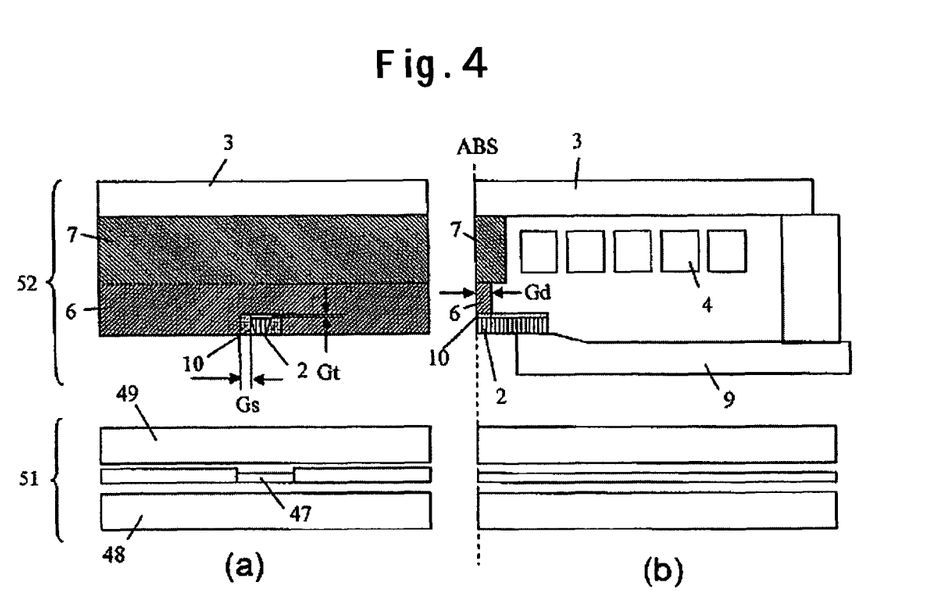
FIG. 4 is a drawing of a typical example illustrating a shape of an air bearing surface and a cross-section of a magnetic head of the present invention.

FIG. 4 shows drawings of a typical example illustrating a shape of an air bearing surface and a cross-section of a magnetic head according to an embodiment of the present invention. FIG. 4(a) shows an air bearing surface view and FIG. 4(b) shows a cross-sectional view. As indicated in FIG. 4(b) which shows a cross-sectional view, a feature of the magnetic head of the present invention is that the wrap around shield part has a step in the height direction of the main pole 2, as shown in the figure, by fabricating the wrap around shields 6 and 7, which are surrounding the sides of the main pole 2, while separating them in the thickness direction of the main pole.

Moreover, controlling the gap spacing between the main pole 2 and the wrap around shield 46 in the trailing direction, Gt, the gap spacing between the main pole and the wrap around shield in the cross-track direction, Gs, and the thickness of the wrap around shield in the sensor height direction (the height in the sensor height direction), Gd, is very important.

Figure 5:
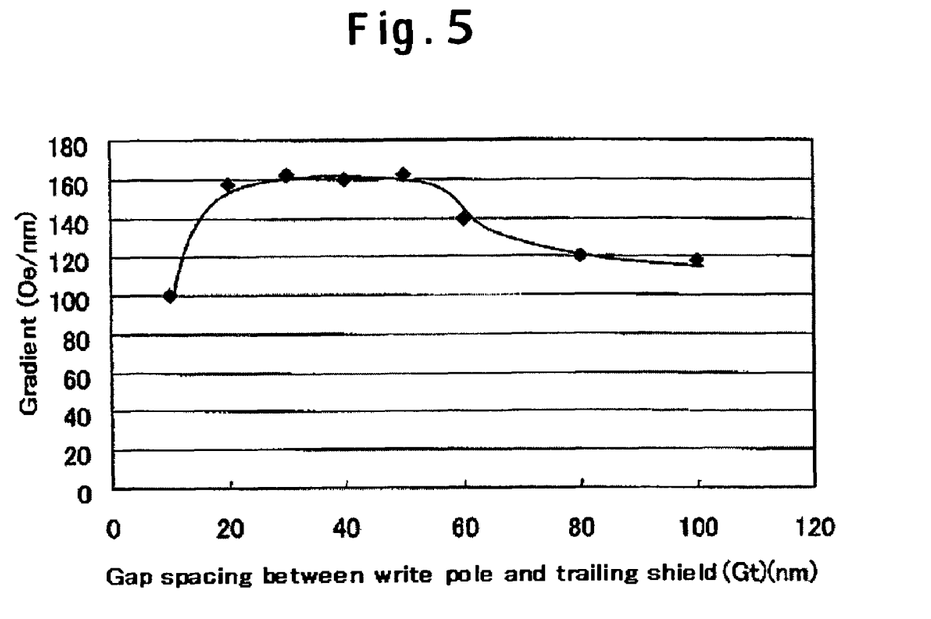
FIG. 5 is a graph showing the relationship between gap spacing in the trailing direction, Gt, and the recording magnetic field gradient.

FIG. 5 is a figure showing the relationship obtained by a three-dimensional magnetic field calculation between the gap spacing of the main pole 2 and the wrap around shield 46 in the trailing direction, Gt, and the recording magnetic field gradient. In this calculation, the width providing the track width of the main pole 2 and the film thickness were assumed to be 120 nm and 200 nm, respectively. The shape of the air bearing surface of the head of the main pole 2 was made to be a trapezoid with the wider side in the trailing direction. Assuming that 45at%Ni-55at%Fe which has a saturation flux density of 1.7 T is used for a material of the main pole 2, a relative permeability of 1000 was used in the calculation. Moreover, it is assumed that 80at%Ni-20 at%Fe having a saturation flux density of 1.0 T is used for the main pole yoke part 9. Assuming that a material having a saturation flux density of 1.0 T is used for the return pole 3, the dimensions used were a width of 30 μm in the cross-track direction, a length of 16 μm the in the sensor height direction, and a film thickness of 2 μm. Assuming that 80at%Ni-20at%Fe having a saturation flux density of 1.0 T is used for the upper shield 49 and the lower shield 48, the dimensions used are a width of 32 μm in the cross-track direction, a length of 16 μm in the sensor height direction, and a film thickness of 1.5 μm. Furthermore, 80at%Ni-20at%Fe having a saturation flux density of 1.0 T was assumed to be used for a material of the wrap around shield. Assuming that CoTaZr is used for a material of the under layer of the magnetic recording medium, the spacing from the air bearing surface of the head to the under layer surface was assumed to be 40 nm and the thickness of the underlayer to be 150 nm. For the calculation the position of the recording field was assumed to be at the center of the medium at a depth of 25 nm from the air bearing surface of the head.

It is understood from FIG. 5 that Gt must be controlled to be a film thickness of about 20 nm to 60 nm, in order to steepen the magnetic field gradient. We have already confirmed that similar results could be obtained even if materials having a greater saturation flux density such as CoNiFe and FeCo, etc. were applied as a material of the main pole 2.

Figure 6:
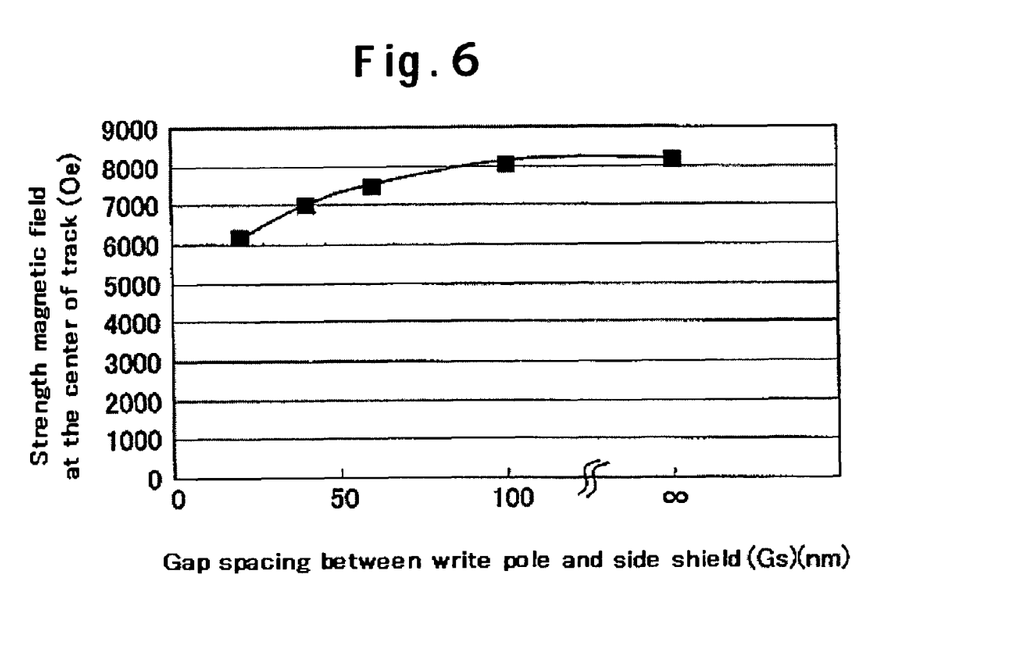
FIG. 6 is a graph showing the relationship between gap spacing in the side direction, Gs, and the strength of the magnetic field at the center of the main pole.

FIG. 6 is a graph obtained by a three-dimensional magnetic field calculation showing the relationship between the gap spacing, Gs, of the main pole 2 and the wrap around shield in the side direction and the strength of the magnetic field at the center of the main pole. In order not to decrease the recording field, it is necessary to control the gap spacing in the side direction, Gs, to be about 100 nm.

Figure 7:
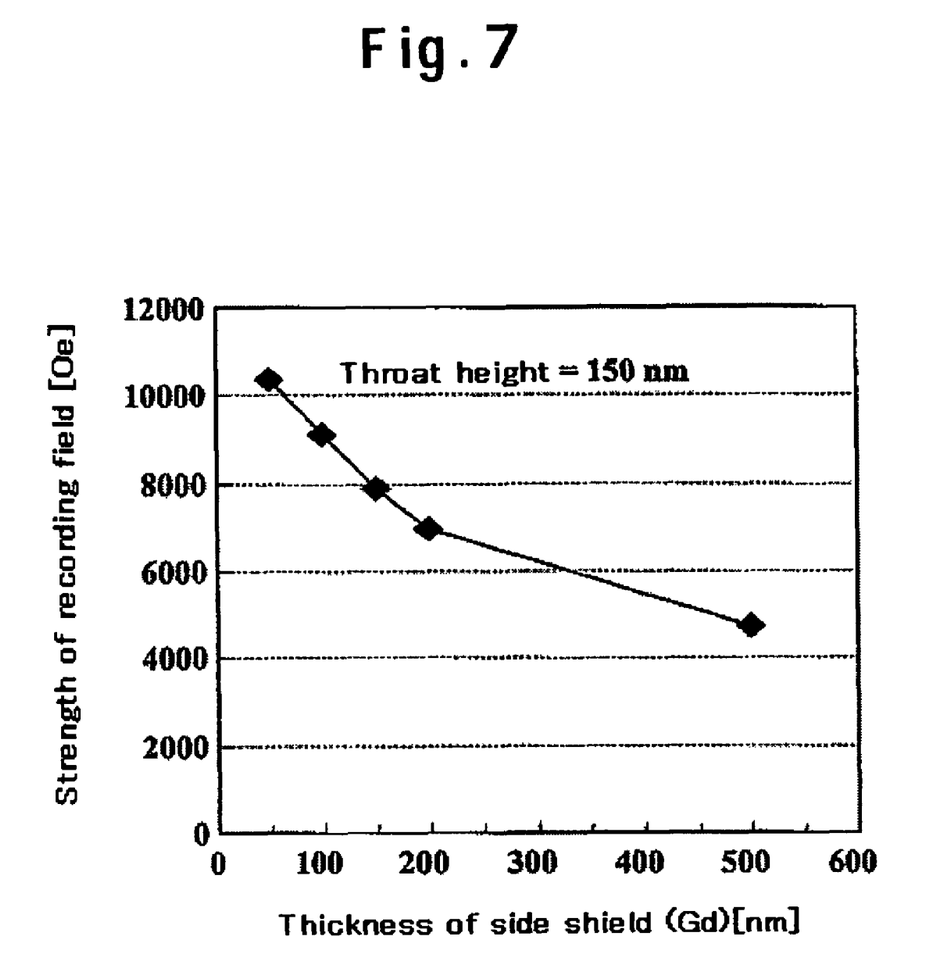
FIG. 7 is a graph showing a relationship between strength of the recording field and the thickness of the side shield from the air bearing surface.
Figure 8:
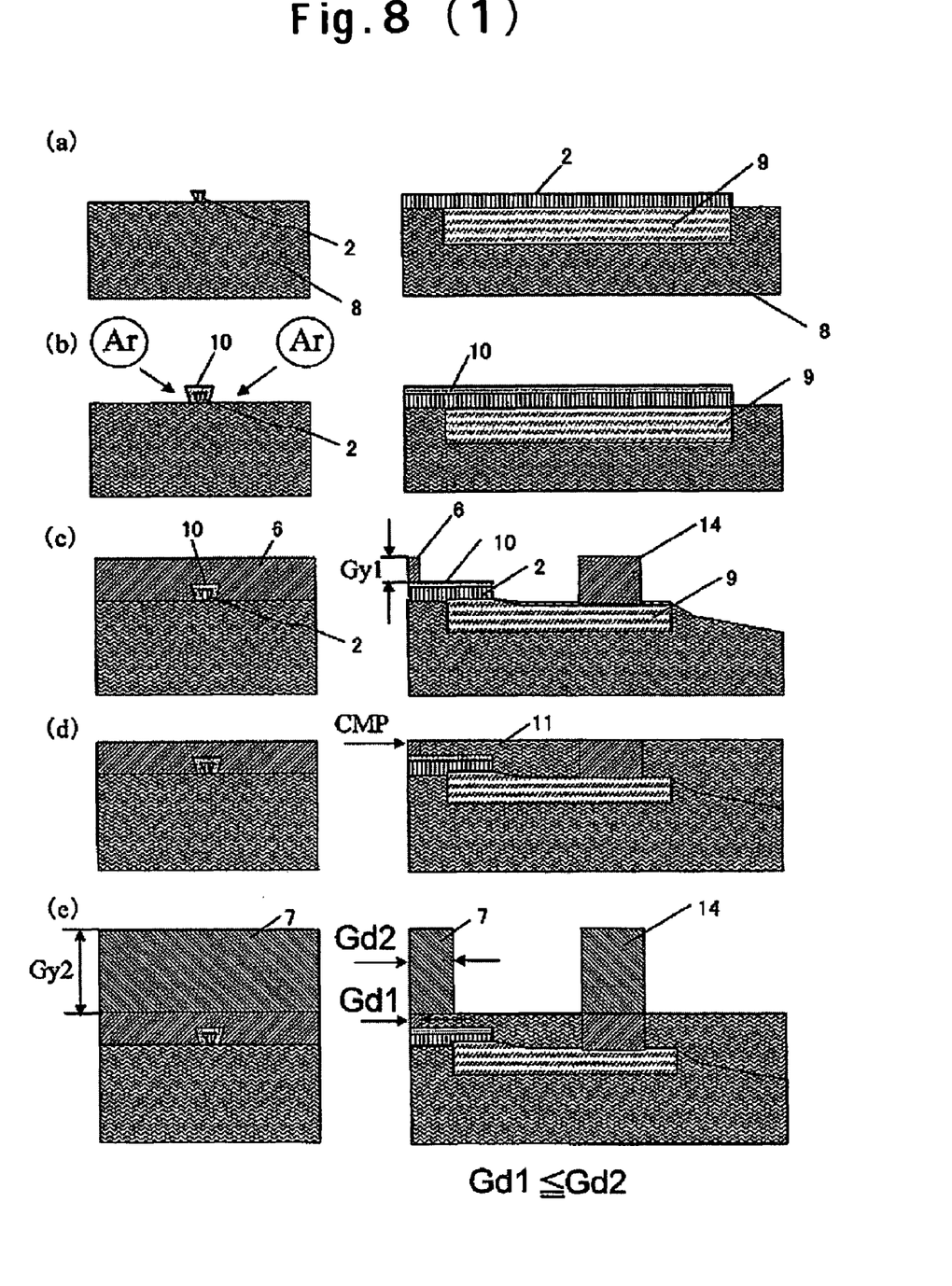

FIG. 7 is a graph showing the relationship between the strength of the recording field and changing the thickness, Gd, of the shield 6 in the sensor height direction, which is the wrap around shield in the main pole 2 direction. The calculation was performed with the throat height of the main pole 2 being 150 nm. As clearly shown in this figure, in order not to cause a rapid decrease in the recording field, it is important that the thickness, Gd, of the shield 6 in the main pole 2 direction along the sensor height direction be controlled to be about 50 nm to 200 nm.

The following is a description of a fabrication process to achieve the above-mentioned structure and its effects referring to the process flow illustrated in FIG. 8(1) and FIG. 8(2). The left side figures are schematic drawings as seen from the air bearing surface, and the right side figures are schematic cross-sectional drawings. Since the fabrication process of the read head is not different from that of the prior art, only a fabrication process of a write head is shown in the figure. A giant magneto-resistive head (GMR head), a tunneling magneto-resistive head (TMR head) which already has a large read back output, and a current perpendicular to the plane (CPP) type GMR head, in which a current flows perpendicular to the film surface, are used for the read head.

(a) A yoke 9 is formed by plating on an insulating layer 8 separating the write head from the read head, and planarized by CMP after being covered by alumina. The material for the yoke is NiFe. The preferable magnetostriction of NiFe is negative from the viewpoint of erasing after reading. First, the main pole 2 is formed on the planarized yoke by an ion milling technique. Because the main pole 2 is formed after the upper magnetic shield, the gap spacing between the read element and the main pole can be reduced, resulting in the read/write gap spacing being made narrower. Format efficiency is improved because the read/write gap spacing can be made narrower.

(b) Next, an alumina film being a gap film is formed on the main pole 2, and processing of a magnetic gap 10 is carried out by an ion milling technique. When the milling angle is 45 to 60 degrees, a desired shape of the main pole as shown in the figure is obtained in which the gap in the trailing direction is thinner and that in the side direction is thicker. After forming the magnetic gap, the yoke 9 and the main pole 2 are separated from the magnetic gap 10 by an ion milling technique. Herein, from the viewpoint of erasing after reading, an embodiment in which the main pole 2 is separated from the yoke 9 is applied, but they do not have to be separated from each other depending on the characteristics.

(c) Next, a seed film is formed by a frame plating technique, and the wrap around shield 6 and a back gap part 14 are simultaneously formed in the thickness direction of the main pole. As mentioned above, because it is important to control the film thickness in the sensor height direction, Gd, in order to maintain the strength of the magnetic field constant, it is preferable that the position be controlled by forming a frame by using a high accuracy stepper. For example, in the case when a Nikon Ex12BKrF stepper is used, it is possible to control the superposition accuracy of the height Gd of the read element and the main pole to be 60 nm or less within 3σ. Control by using superposition measuring equipment may be used as a further high precision technique. Moreover, a soft magnetic material is used for the shielding material. Permalloy (NiFe) can be used as a typical soft magnetic material. For instance, other magnetic materials such as FeCo, FeCoNi, NiFeCr, and FeNiCu, etc. can be also used. The method for forming the soft magnetic film may be a sputtering technique. In the case when a plating technique is used, a nonmagnetic material may be used for the seed film. When a nonmagnetic material is used for the seed film, it is necessary that the seed film thickness be included in the gap film thickness.

(d) After forming the wrap around shield 6 in the height direction of the main pole, the alumina film 11 is formed and planarized by CMP. According to this CMP, the step around the yoke created by milling in the fabrication process of the main pole can be canceled. When the height of the wrap around shield 6 in the trailing direction is assumed to be Gy1, it is preferably about 300 nm or more in order to maintain the withstand voltage.

(e) A seed film (not shown in the figure) is formed on the planarized wrap around shield 6, the frame is shifted in the sensor height direction of the main pole, and the wrap around shield 7 and the back gap part 14 are simultaneously formed by a plating technique. Permalloy (NiFe), which is a typical soft magnetic material, can be used for a shield material of the wrap around shield 7, the same as the wrap around shield 6.

For instance, other soft magnetic materials, for instance, FeCo, FeCoNi, NiFeCr, and FeNiCu, etc., can also be used. The method for forming the soft magnetic film may be a sputtering technique. Moreover, both wrap around shields 6 and 7 may use the same soft magnetic material and a combination of different soft magnetic materials.

At this time, as shown in FIG. 8(*e*), the relationship of Gd1<Gd2 is made up by the height of the wrap around shield 6 in the sensor height direction (defined as Gd1) and the height of the wrap around shield 7 (defined as Gd2). Moreover, when the height of the wrap around shield 7 in the trailing direction is Gy2, considering coil fabrication, it is preferably about 1 μm or more. Furthermore, the thickness of the wrap around shield 7 in the sensor height direction is preferably from about 300 nm to 500 nm, considering the TPR of the magnetic material of the shield. When the thickness of the shield is 500 nm or more, there is a concern that the shield material itself will expand.

(f) After forming the wrap around shield 7, an insulating layer 12 insulating the coil from the shield, and the coil 4, a resist 13 which is a coil insulating layer, and the alumina film 11 are laminated. Due to covering the coil upper surface by alumina, which has excellent thermal conductivity, there is an effect of suppressing the coil heat generation and reducing the TPR.

(g) Next, after forming the alumina on the coil, it is planarized by CMP. A return pole 3 is formed on the planarized wrap around shield 7. The thickness of the return pole 3 is preferably about 2.0 μm or less from the viewpoint of reduction of TPR. After forming the return pole, this process is completed.

Figure 9:
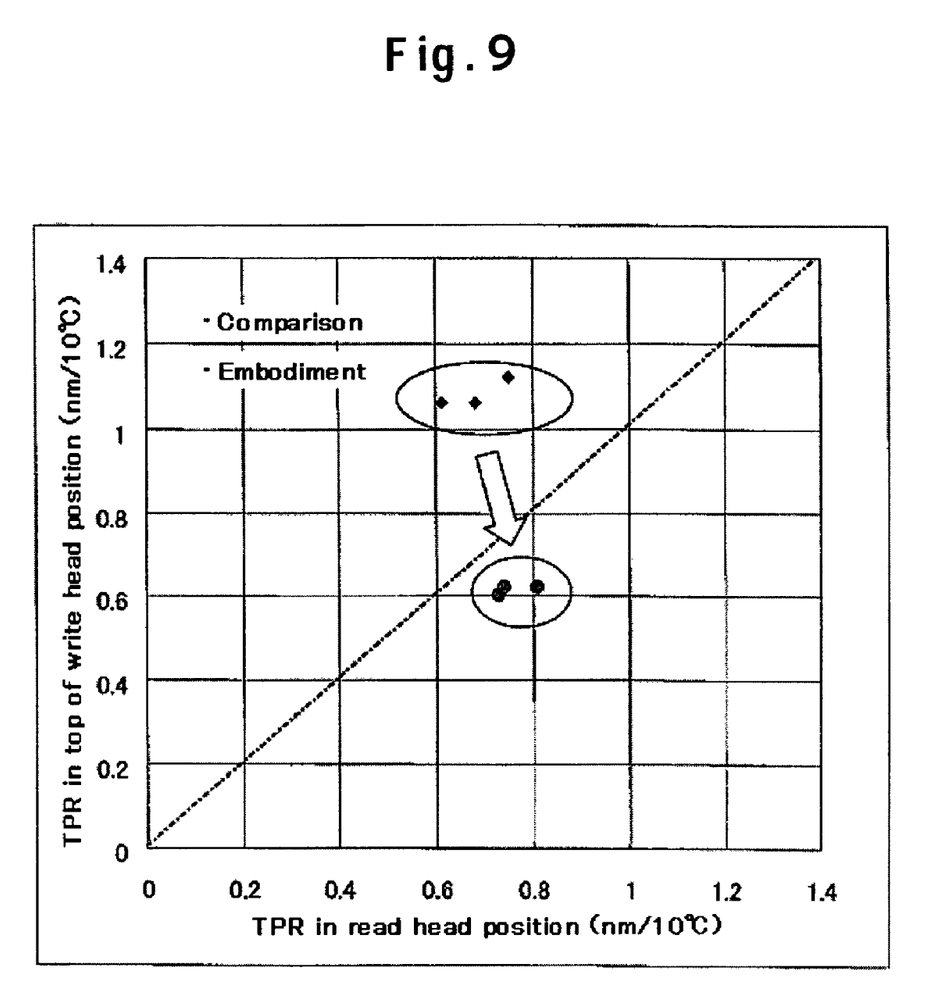
FIG. 9 is a graph of the measured TPR of a perpendicular magnetic head.

FIG. 9 shows TPR measurement results of the perpendicular magnetic head of the present embodiment which is formed by partitioning the wrap around shield. As shown in the figure, TPR was reduced by 0.4 nm compared to the TPR of the recording head part between the perpendicular head of a prior art (Gd1=100 nm and a film thickness of the return pole of 2.0 μm), in which the wrap around shield is not partitioned and only the wrap around shield 1 is formed, and the perpendicular head of the present embodiment (Gd1=100 nm, Gd2=300 nm, and a film thickness of the return pole of 1.5 μm).

Figure 10:
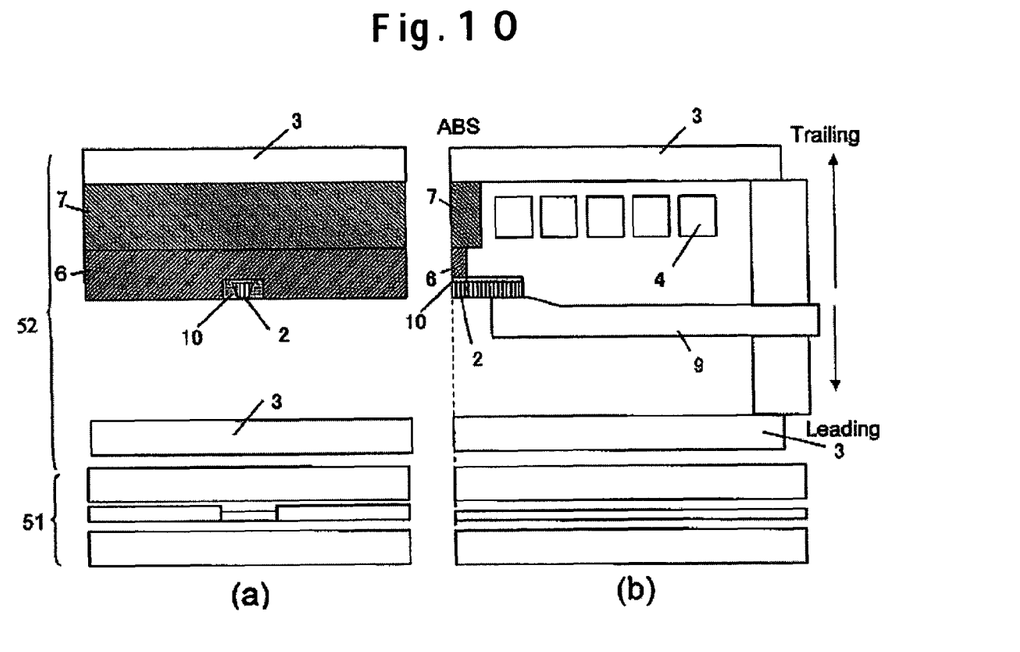
FIG. 10 is a schematic drawing of another embodiment illustrating a perpendicular magnetic head of the present invention.

FIG. 10 is a schematic drawing of another embodiment illustrating a perpendicular magnetic head of the present invention. FIG. 10(*a*) shows an air bearing surface view and FIG. 10(*b*) shows a cross-sectional view. A perpendicular magnetic head of this embodiment is one in which the wrap around shield partitioned in the thickness direction of the main pole is applied to a so-called cusp type perpendicular magnetic head in which the return pole is arranged in the trailing direction and the leading direction of the main pole. The present invention is applicable to a perpendicular magnetic head having such an arrangement.

Figure 11:
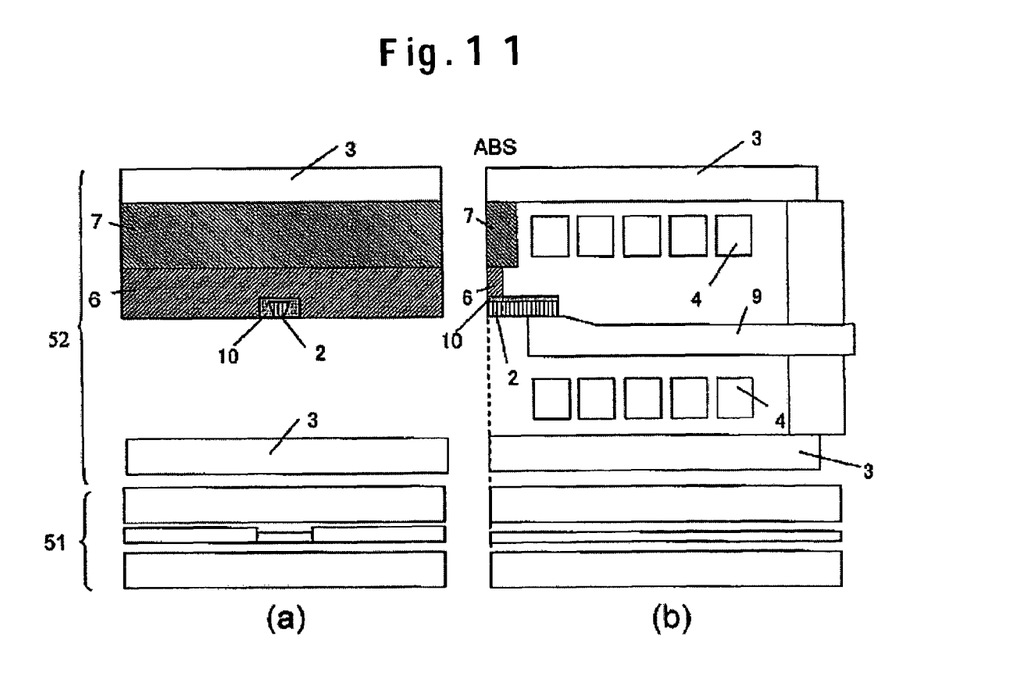
FIG. 11 is a schematic drawing of a further embodiment illustrating a perpendicular magnetic head of the present invention.

FIG. 11 is a schematic drawing of a further embodiment illustrating a perpendicular magnetic head of the present invention. FIG. 11(*a*) shows an air bearing surface view and FIG. 11(*b*) shows a cross-sectional view. A perpendicular magnetic head of this embodiment is based on the perpendicular magnetic head shown in FIG. 10, and is a perpendicular magnetic head where a coil is placed between the return pole in the leading direction and the main pole. The coil may be a spiral coil which is wound in the current sensor height direction and a helical oil which is wound in the trailing direction.

According to mounting a magnetic recording head for perpendicular recording of the present invention, both track and linear recording density can be improved, resulting in the manufacture of a magnetic reading/writing apparatus having an areal recording density of 200 Gbit/in$^2$.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head comprising:
   a main pole;
   a return pole;
   a wrap around shield including a first shield separated from the main pole by a gap, and a second shield in contact with the first shield, the first shield formed covering an entire length of both sides of said main pole in a cross-track direction and an entire length of a side of said main pole in a trailing direction, but does not cover the main pole in a leading direction,
   wherein, regarding a height of said wrap around shield in a sensor height direction, a height of the first shield at a trailing edge side is smaller than a height of the second shield away from the trailing edge side.

2. The magnetic head according to claim 1, wherein a height of said first shield in the sensor height direction is in the range from about 50 nm to 200 nm.

3. The magnetic head according to claim 1, wherein a height of said second shield in the sensor height direction is in the range from about 300 nm to 500 nm.

4. The magnetic head according to claim 1, wherein said return pole, said first shield and second shield are composed of different magnetic materials.

5. The magnetic head according to claim 1, wherein said return pole includes a first return pole placed at a trailing side of said main pole and a second return pole placed at a leading side of said main pole, and said second shield is connected to said first return pole.

6. The magnetic head according to claim 5, further comprising a coil formed at a gap between said main pole and said first return pole and a coil formed at a gap between said main pole and said second return pole.

7. The magnetic head according to claim 1, wherein said return pole and said wrap around shield are composed of the same magnetic material.

8. The magnetic head according to claim 1, wherein a gap spacing between the main pole and the wrap around shield in the trailing direction is about 20-60 nm.

9. The magnetic head according to claim 1, wherein a gap spacing between the main pole and the wrap around shield in the cross-track direction is about 100 nm.

10. A magnetic read/write apparatus comprising:
    a magnetic recording medium providing a magnetic recording layer and a soft underlayer;
    a medium actuator driving said magnetic recording medium;
    a magnetic head reading from/writing to said magnetic recording medium comprises a main pole, a return pole, and a wrap around shield including a first shield separated from the main pole by a gap, and a second shield in contact with the first shield, the first shield formed covering an entire length of both sides of said main pole in the cross-track direction and an entire length of the side of said main pole in the trailing direction at an air bearing surface, but does not cover the main pole in a leading direction, in which, regarding the height of said wrap around shield in the sensor height direction, the height of the first shield at the trailing edge side is smaller than the height of the second shield away from the trailing edge side; and a magnetic head actuator driving said magnetic head relative to said magnetic recording medium.

11. The magnetic read/write apparatus according to claim 10, wherein a height of said first shield in the sensor height direction is in the range from about 50 nm to 200 nm.

12. The magnetic read/write apparatus according to claim 10, wherein a height of said second shield in the sensor height direction is in the range from about 300 nm to 500 nm.

13. The magnetic read/write apparatus according to claim 10, wherein said return pole, said first shield and second shield are composed of different magnetic materials.

14. The magnetic read/write apparatus according to claim 10, wherein said return pole includes a first return pole placed at a trailing side of said main pole and a second return pole placed at a leading side of said main pole, and said second shield is connected to said first return pole.

15. The magnetic read/write apparatus according to claim 14, further comprising a coil formed at a gap between said main pole and said first return pole and a coil formed at a gap between said main pole and said second return pole.

16. The magnetic read/write apparatus according to claim 10, wherein said return pole and said wrap around shield are composed of the same magnetic material.

17. The magnetic read/write apparatus according to claim 10, wherein a gap spacing between the main pole and the wrap around shield in the trailing direction is about 20-60 nm.

18. The magnetic read/write apparatus according to claim 10, wherein a gap spacing between the main pole and the wrap around shield in the cross-track direction is about 100 nm.

* * * * *